US00RE36215E

United States Patent [19]

Rosenthal

[11] E Patent Number: Re. 36,215

[45] Reissued Date of Patent: Jun. 1, 1999

[54] SWIRL ANTI-ICE SYSTEM

[75] Inventor: Herman Allen Rosenthal, San Diego, Calif.

[73] Assignee: Rohr, Inc., Chula Vista, Calif.

[21] Appl. No.: 08/545,967

[22] Filed: Oct. 20, 1995

Related U.S. Patent Documents

Reissue of:

[64] Patent No.: 4,688,745
Issued: Aug. 25, 1987
Appl. No.: 08/822,128
Filed: Jan. 24, 1986

[51] Int. Cl.[6] ..... B64D 15/02

[52] U.S. Cl. ..... 244/134 B; 244/134 R; 60/39.093

[58] Field of Search ..... 244/134 R, 134 B; 60/39.093; 415/117, 118; 239/548

[56] References Cited

U.S. PATENT DOCUMENTS

| | | | |
|---|---|---|---|
| 2,435,990 | 2/1948 | Weiter | 244/134 B |
| 2,680,345 | 6/1954 | Frost | 60/39.093 |
| 2,686,631 | 8/1954 | Jordan | 230/209 |
| 2,711,453 | 6/1955 | Leigh, Jr. | 60/39.093 |
| 2,712,727 | 7/1955 | Morley et al. | 60/39.093 |
| 2,747,365 | 5/1956 | Rainbow | 60/39.093 |
| 3,057,154 | 11/1962 | Sherlaw et al. | 415/117 |
| 3,614,257 | 10/1971 | Campbell | 415/176 |
| 3,834,157 | 9/1974 | Hoffman | 60/39.09 D |
| 3,925,979 | 12/1975 | Ziegler | 60/39.07 |
| 3,933,327 | 1/1976 | Cook et al. | 60/39.093 |
| 3,978,656 | 9/1976 | Murphy | 60/39.09 P |
| 4,240,250 | 12/1980 | Harris | 60/39.09 D |
| 4,615,499 | 10/1986 | Knowler | 244/134 B |
| 4,674,714 | 6/1987 | Cole et al. | 244/134 R |
| 4,831,819 | 5/1989 | Norris et al. | 244/134 R |

OTHER PUBLICATIONS

DTIC, Technical Report, Adesing manual for Thermal anti--icing systems, pp. 8–11, Dec. 1954.
ASL 0375, Skin Assy–Inner Ilp Cowl, Dec. 1972.
ASL 0015, Lip Assy–Nose Cowl, Jul. 1969.
NSM 6060, Douglas J, Aug. 1995.
ROHR, 1990 Annual Report, 1990.

*Primary Examiner*—Virna Lissi Mojica
*Attorney, Agent, or Firm*—Patrick J. Schesinger

[57] ABSTRACT

A system for circulating heated gases within the circular leading edge of a jet engine housing to prevent ice build-up thereon, or to remove accumulated ice thereform. Hot gases such as air from a hot, high pressure section of the jet-engine are directed through a conduit. The conduit enters the annular leading edge housing, usually from the aft side through a bulkhead, then turns about 90° to a direction tangential to the leading edge annulus. The hot gases exiting the tube entrain the cooler air in the housing, causing a much larger mass of air to swirl circularly around the annular housing. The entering hot gasses heat the mass of air to an intermediate, but still relatively hot, temperature. This large mass of circularly moving hot air is quite efficient in uniformly transferring heat to the skin of the leading edge without leaving any relatively cold areas and preventing the formation of ice thereon.

10 Claims, 2 Drawing Sheets

SWIRL ANTI-ICE SYSTEM

Matter enclosed in heavy brackets [ ] appears in the original patent but forms no part of this reissue specification; matter printed in italics indicates the additions made by reissue.

BACKGROUND OF THE INVENTION

The formation of ice on aircraft wings, propellers, engine inlets, etc. has been a problem since the earliest days of heavier-than-air flight. Any accumulated ice adds considerable weight, and changes the airfoil or inlet configuration making the aircraft much more difficult to fly and in some cases has caused the loss of aircraft. In the case of jet aircraft, chunks of ice breaking loose from the leading edge of an engine inlet housing can severely damage turbine blades or other internal engine components and cause engine failure.

Many attempts have been made to overcome the problems and dangers of aircraft icing. For example, proposals have been made, as described in U.S. Pat. No. 2,135,119 to mechanically vibrate external surfaces to break ice loose, or, as described in U.S. Pat. No. 3,549,964 to generate electromagnetic pulses in the aircraft skin to break ice loose. These systems, however, tend to be heavy and complex and to only remove existing ice, rather than prevent ice formation.

Heating areas of the aircraft prone to icing has been suggested many times. The heating ranges from microwave heating as suggested by U.S. Pat. No. 4,060,212 to feeding hot gases through holes in the skin, as suggested by U.S. Pat. No. 4,406,431, to resistance heating of the surfaces (U.S. Pat. No. 1,819,497) to actually burning fuel adjacent to ice-prone surfaces, as described in U.S. Pat. No. 2,680,345. While each of these methods have some advantages, none has been truly effective.

One of the most common anti-ice techniques has been the ducting of hot gases into a housing adjacent to the likely icing area. Typical of the patents describing such hot gas techniques are U.S. Pat. Nos. 3,057,154; 3,925,979; 3,933,327 and 4,240,250. In each case, the hot gas conduits simply dump hot gases into a housing, such as the leading edge of a jet engine housing or a wing leading edge. While often useful, these systems are not fully effective due to the low quantity of hot gases introduced relative to the mass of air in the housing, the heating effect tending to be limited to the region near the hot gas introduction point, and the complexity of the hot gas duct system.

Thus, there is a continuing need for improving aircraft icing prevention and removal systems having greater efficiency and mechanical simplicity.

SUMMARY OF THE INVENTION

The above-noted problems, and others, are overcome by the anti-ice system of this invention, which basically comprises at least one conduit means or tube to direct hot gas, such as air, from a source of hot, high pressure gases such as a hot, high pressure region of a jet engine to an annular housing around the leading edge of the engine housing. The hot gas conduit enters the housing, generally through a transverse bulkhead from the back, then s immediately bent about 90° so as to expel the hot gases at high velocity substantially along a tangent to the annular housing interior. Preferably, the outlet end of the hot gas conduit includes at least one nozzle configured to optimize the velocity of the existing hot gases.

As the exiting hot air begin to mix with the larger mass of stationary air in the housing, heat is transferred bringing the mass of air up to an intermediate, but still high, temperature. At the same time, the small stream of high speed gases begin to entrain the larger air mass, bringing the velocity of gases and air to an intermediate velocity. In essence, energy is conserved by trading high velocity and high temperature in a small mass of gases for lower velocity and slightly lower temperature in a larger mass of air/gas mixture.

This has been found to be a very efficient and simple anti-icing system in that effective heat transfer takes place from the large mass of heated moving air to the housing walls while retaining mechanical simplicity. There are no moving mechanical parts or electrical parts to jam or burn-out.

BRIEF DESCRIPTION OF THE DRAWING

Details of the invention, and of preferred embodiments thereof, will be further understood upon reference to the drawing, wherein.

DETAILED DESCRIPTION OF THE INVENTION

Figure 1:
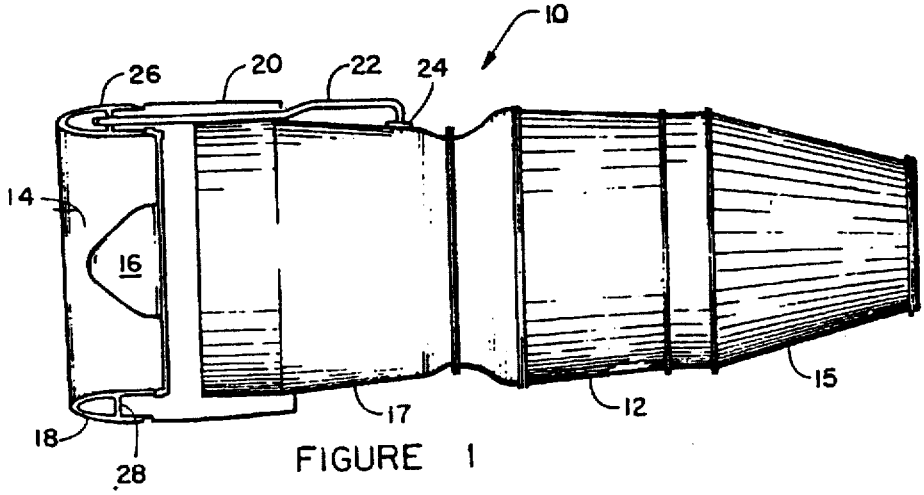
FIG. 1 is a schematic elevation view, partially in section of a conventional gas turbine or jet engine showing the system of this invention.

Referring now to FIG. 1, there is seen a schematic representation of a jet engine 10 of the sort suitable for aircraft propulsion. The turbine is housed within central housing 12. Air enters through inlet section 14, between nose cap 16 and the annular housing 18 which constitutes the forwardmost section of the engine nacelle 20. Engine thrust is produced by burning incoming air and fuel within central housing 12. Hot, high pressure propulsion gases pass through exhaust assembly 15 and out the rear of the engine.

In flight, under "icing conditions", ice tends to form on annular housing 18 and nose cap 16 (in addition to other aircraft components not being considered here). The ice changes the geometry of the inlet area between annular housing 18 and nose cap 16, adversely affecting the required quantity and flow path of incoming air. Also, pieces of ice may periodically break free from these components and enter the engine, damaging rotor blades and other internal engine components. This invention is concerned with preventing accumulation of ice on the surface of annular housing 18. Other techniques may be used with nose cap 16 and other aircraft parts, such as wing leading edges, control surfaces or the like.

Within compressor section 17 there is a region containing hot, high pressure gases. A conduit means or tube 22 is connected at a first end 24 to that hot, high pressure region. The other end 26 of tube 22 penetrates a bulkhead 28 at the back of annular housing 18. In some prior art ice prevention methods, the tube simply terminates at this point, serving to deliver hot gases into the annular space. Even with complex, heavy, ducting within the annular housing, heating was not uniform, with some hot spots and other cold spots which tended to accumulate ice. Sometimes a large number of tubes 22 were used in order to bring more hot air forward. The additional tubes added considerable weight and still allowed hot and cold areas.

Conduit means 22 could have a configuration other than the preferred tube, if desired. For example, a channel could be formed along the outer surface of the engine housing. Also, the hot gases could be produced in any conventional heater, rather than the preferred hot engine section, if desired. An auxiliary source of hot gases could be provided for use in melting ice when the aircraft is on the ground and the engine is not operating.

Figure 2:
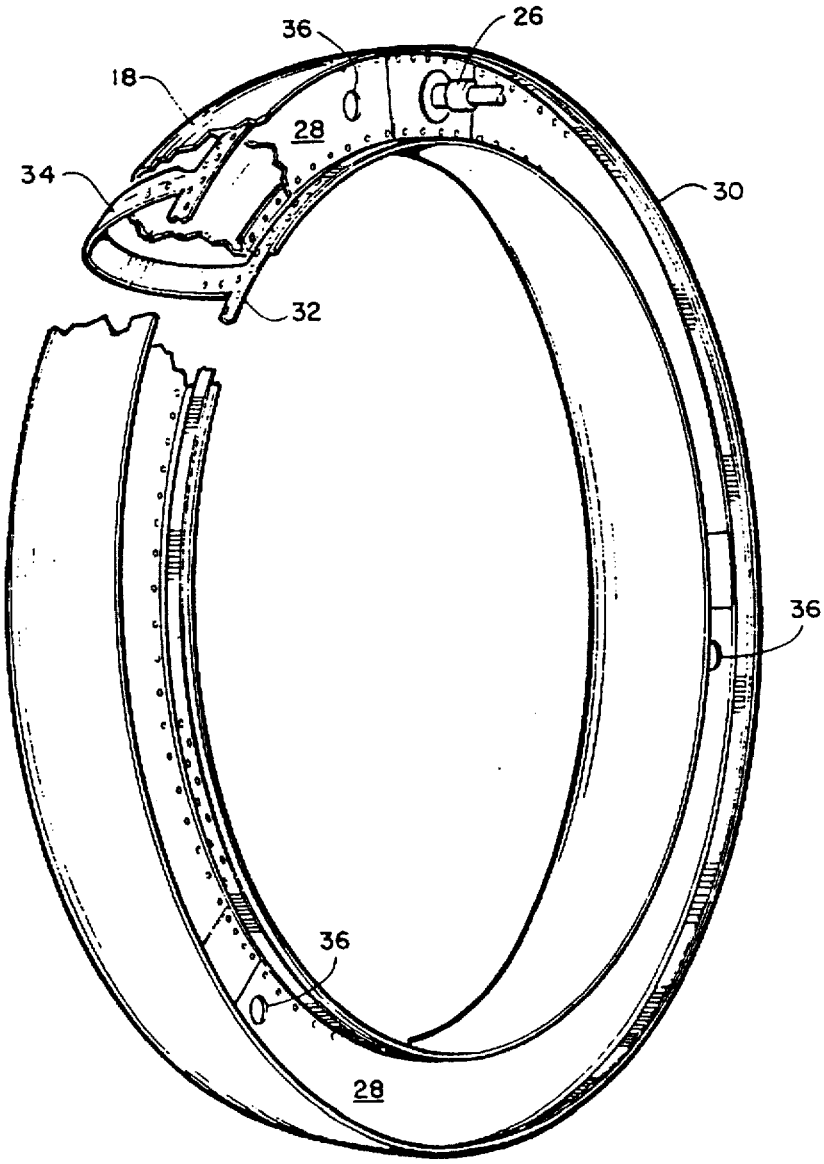
FIG. 2 is a schematic perspective view of the annular engine inlet leading edge housing with the skin removed.

FIG. 2 shows the annular housing 18 in perspective with the sheet aluminum skin removed to show the internal structure. Between rear bulkhead 28 and the skin are two metal rings 31 and 32. Several metal support straps 34 extend between rings 31 and 32 and to maintain the skin in the desired shape. A plurality of holes 36 are provided in bulkhead 28 to allow gases within the annular housing 18 to escape. The front end 26 of tube 22 is seen penetrating through bulkhead 28.

Figure 3:
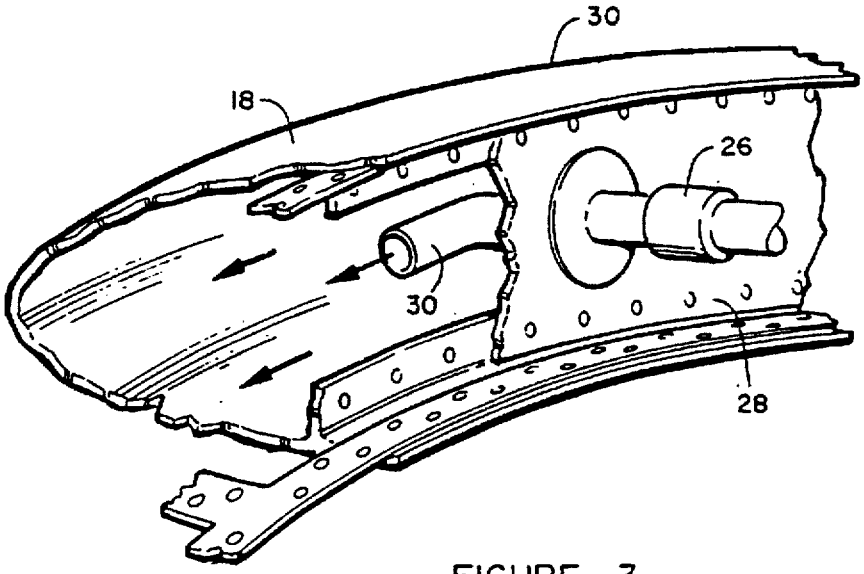
FIG. 3 is a schematic perspective view of details of the annular inlet leading edge showing my novel hot gas nozzle.

The primary novel feature of my invention is most clearly shown in FIG. 3. After front end 26 of tube 22 penetrates bulkhead 28 and enters annular housing 18, it is Cm most embodiments) bent substantially 90° so that the very end 30 of tube 22 is tangent to the centerline of annular housing 18. This seemingly simple change makes a surprising improvement in the de-icing capability of the system. As hot high-pressure gases exit very 30 of tube 22, the high velocity flow entrains air within housing 18 and causes it to swirl around the circular interior. The hot gases rapidly mix with the stagnant air, causing the entire air mass to move in the circular direction and to reach a temperature intermediate between the entering hot gas temperature and that of the stagnant air. The temperature within housing 18 rises until a stable temperature is reached at which heat lost be conduction through the skin of housing 18 and carried off with exhaust gases through holes 36 equals the heat being brought in by additional hot gases through tube 22. This heat transfer is sufficient to prevent the formation of ice on the exterior of housing 18. In only the most extreme conditions will it be desirable to add second tube 22 to increase hot gas flow. Because of the swirling effect and the constant mixing of the incoming hot gases with gases in the housing there will be no hot or cold spots. The temperature immediately downstream of tube end 30 will be only very slightly higher than that just upstream of that hot gas inlet because of the continuous movement of the gas mass within housing 18.

In a typical aircraft engine, the volume of annular housing 18 may be about 10 ft.$^3$. With such an engine, tube 22 may have a diameter of about 1.5 in. and should carry hot gasses having a temperature of about 100° to 500° F. and a gas velocity of about 3 to 30 ft/min. Under these conditions the temperature within annular housing 18 can be maintained at a temperature of from about 35° to 41° F. when outside air temperature is about –40° F.

Preferably the mass flow rate of gases and air moving in the annular of the housing 18 is at least about three times the mass flow rate of gases leaving the tube end 30.

End 30 of tube 22 may have any suitable configuration. Examples are shown in FIGS. 4–7. Aerodynamic fairings may be used on the tubes or the tubes may be configures into aerodynamic shapes to increase performance. In many cases, a simple cylindrical end corresponding to the diameter of tube 22 may be sufficient. In other cases, hot gas velocity may be increased, if desired, by providing a converging diverging nozzle on end 30 corresponding to a garden hose nozzle or the like.

The number and size of outlet holes 36 will be selected to allow a quantity of gases to exit housing 18 corresponding to the quantity entering through tube 22. Smaller holes 36 will result in undesirable higher pressure in housing 18 while larger (or more in number) holes 36 will reduce that pressure. Holes 36 may have any suitable number or shape. Preferably, holes 36 lie in a plane parallel to the direction of gas flow within the annular housing to avoid direct impingement of the rapidly moving gases on the holes.

Figure 4:
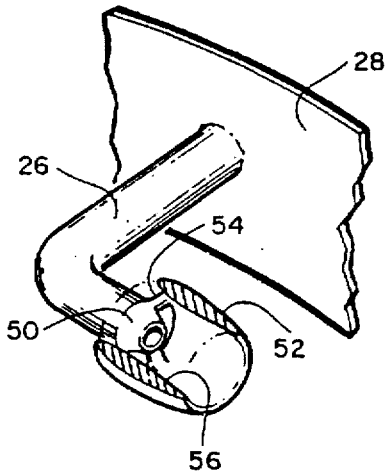
FIG. 4 is a schematic perspective detail view showing an ejector embodiment of my hot gas nozzle.
Figure 5:
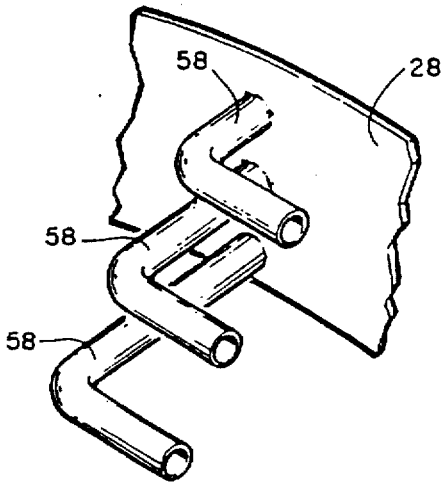
FIG. 5 is a schematic perspective detail view showing a multi-nozzle embodiment of my hot gas nozzle.

FIGS. 4–7 illustrate several preferred embodiments of my hot gas nozzle. Excellent performance is obtained with the ejector nozzle as seen in FIG. 4. Tube 26 penetrates bulkhead 28 and is bent about 90° in the direction of desired annular gas flow. The end of tube 26 has a converging nozzle 50. A sleeve 52 surrounds nozzle 50 and is held in place by several webs 54. The interior surface of sleeve 52 has a converging-diverging shape 56 to provide the desired venturi effect.

If desired a plurality of spaced tubes 58 may extend from a manifold (not shown) behind bulkhead 28 connected to tube 26. Each of tubes 58 may extend a different distance beyond bulkhead 28 before making the about 90° turn, and may lie in one or several horizontal planes. The ends of tubes 58 may be plain or may have any desired nozzle configuration, such as those shown in FIGS. 4 and 6. While the tube bend is preferrably about 90°, the angle may also be varied as desired for a particular application.

Figure 6:
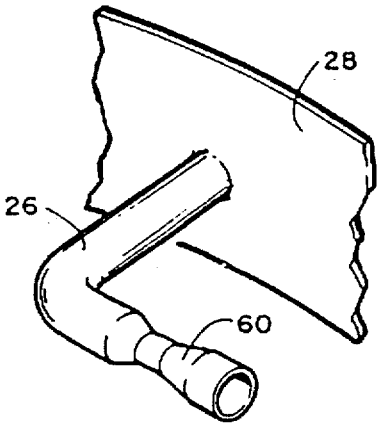
FIG. 6 is a schematic perspective detail view showing a converging-diverging embodiment of my hot gas nozzle.

Hot gas velocity may be increased as seen in FIG. 6 by using a converging-diverging nozzle 60 at the end of tube 26, which has entered through bulkhead 28 and been bent about 90°.

Figure 7:
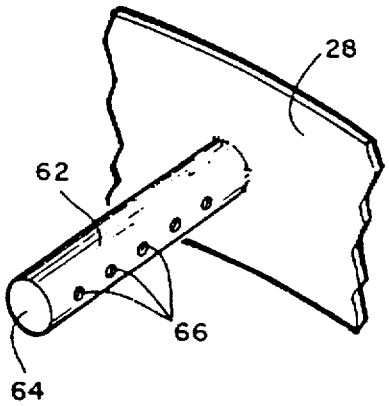
FIG. 7 is a schematic perspective detail view showing a piccolo-tube embodiment of my hot gas nozzle.

As seen in FIG. 7, a straight tube 62 with a closed end 64 could enter through bulkhead 28 and have a plurality of holes 66 in the direction of desired hot gas flow. This "piccolo" tube can be bent slightly in any desired direction and two or more space piccolo tubes may be used, if desired. The tube 62 may have an airfoil shape to reduce drag on the moving mass of gas in the annular housing.

While the nozzle types and arrangements shown in FIGS. 4–7 are preferred for most effective performance, any other type of tube or nozzle may be used. The preferred nozzles as shown may be used in any suitable numbers and arrangements.

While certain specific assemblies, structural arrangements and sizes are provided in the above description of preferred embodiments, these may be varied where suitable with similar results. For example, the size and/or number of tubes 22 and the temperature and velocity or pressure of the hot gases directed to annular housing 18 may be selected in accordance with the icing conditions anticipated to be encountered by the specific aircraft.

Other applications, variations and ramifications of this invention will occur to those skilled in the art upon reading this disclosure. Those are intended to be included within the scope of this invention as defined in the appended claims:

What is claimed is:

1. An anti-icing system for *a nose cowl for an* annular *inlet of an aircraft* jet engine [housing] *propulsion system for an aircraft* which comprises:

a source of high pressure hot gas;

at least one conduit means to carry hot gases from said source;

a substantially closed annular [housing] *single skin nose cowl having an exterior surface and an interior surface and positioned* at the leading edge of *an inlet* of a jet engine *propulsion system and arranged for grazing flow of ambient air over the outer exterior surface when the aircraft is in flight*, the annular [housing] *nose cowl* containing a quantity of air;

said at least one conduit means extending into said [housing] *nose cowl*;

an outlet on the end of each of said at least one conduit means extending into said [housing] *nose cowl*, said outlet oriented to eject said hot gases at high velocity substantially tangential to a centerline of said annular [housing] *nose cowl*;

the mass flow rate of the gases and air swirling in said annular [housing] *nose cowl in a rotational direction around the interior of said annular nose cowl and in direct contact with the interior surface of such nose* being at least about three times the mass flow rate of gases leaving said outlet; and whereby the high velocity hot gases entrain *said quantity of* air within said annular [housing] *nose cowl* so that the total volume of air and gases swirling around *the interior of* said annular [housing] *nose cowl* has a substantially uniform temperature intermediate between that of said air and said hot gases *and by direct contact with the interior surface of the nose cowl substantially uniformly heating the nose cowl to a temperature that is sufficiently high to preclude the formation of ice on the exterior surface of the nose cowl by the grazing flow of ambient air when the aircraft is in flight.*

2. The system according to claim 1 wherein the aft end of said annular [housing] *nose cowl* is closed by a transverse bulkhead having at least one hole to allow air and gases with said [housing] *nose cowl* to escape.

3. The system according to claim 2 wherein said conduit means enters through said bulkhead and is bent about 90° to said tangential orientation.

4. The system according to claim 1 wherein said outlet includes a nozzle means to increase the velocity of exiting gases.

5. The system according to claim 1 wherein the source of said hot gases is a hot, high pressure region of said jet engine.

6. The system according to claim 1 wherein said outlet means comprises a converging nozzle extending in the direction of desired gas flow in said [housing] *nose cowl* and a converging-diverging sleeve surround and spaced from said nozzle.

7. The system according to claim 1 wherein said outlet means includes a plurality of tubes ending in spaced hot gas outlets extending in the direction of desired gas flow within said [housing] *nose cowl.*

8. The system according to claim 1 wherein said outlet means comprises at least one tube extending in the direction of desired gas flow in said annulus and having a converging-diverging nozzle at the tube end.

9. The system according to claim 1 wherein said outlet means comprises at least one piccolo tube extending into said housing substantially transverse to the direction of desired gas flow in said [housing] *nose cowl* substantially transverse to the direction of desired gas flow in said [housing] *nose cowl*, said tube having a plurality of holes along the side thereof in said direction of desired gas flow.

10. An anti-icing system for annular jet engine housings which comprises:

a hot, high pressure region of a jet engine;

at least one conduit means adapted to carry hot gases from said region having a temperature of about 100 to 500 degrees F. and a velocity of about 3 to 30 ft./min.;

a substantially annular *single skin* housing *having an exterior surface and an interior surface and positioned* at the leading edge of said engine, a bulkhead closing the aft end of said *single skin* housing *and* having at least one hole to allow air and gases within said housing to escape;

said at least one conduit extending into said housing through said bulkhead;

at least one outlet at the end of each conduit within said housing, said at least one outlet oriented to eject said hot gases at high velocity substantially tangential to a centerline of said annular *single skin* housing;

nozzle means connected to said at least one outlet for increasing the velocity of gases exiting therefrom; and the high velocity hot gases entraining air within said annular *single skin* housing so that the total volume of air and gases swirling around *the interior of* said annular housing *in a rotational direction* has a substantially uniform temperature of from about 35 to 41 degrees F. when the outside air temperature is about −40 degrees F., and the mass flow rate of said gas and air is at least about three times the mass flow rate of the gases leaving said outlet *whereby such rotating hot gases and air by direct contact with the interior surface of single skin annular housing raise the temperature of said housing to a substantially uniform temperature that is sufficiently high to preclude the formation of ice on the exterior surface of said housing.*

* * * * *